US008825483B2

(12) United States Patent
Bardino et al.

(10) Patent No.: US 8,825,483 B2
(45) Date of Patent: Sep. 2, 2014

(54) APPARATUS AND METHOD FOR TRANSFORMING AUDIO CHARACTERISTICS OF AN AUDIO RECORDING (75) Inventors: Daniele Giuseppe Bardino, London (GB); Richard James Griffiths, London (GB)

(73) Assignee: Sony Computer Entertainment Europe Limited (GB)

( * ) Notice: Subject to any disclaimer, the term of this patent is extended or adjusted under 35 U.S.C. 154(b) by 1183 days.

(21) Appl. No.: 12/375,792

(22) PCT Filed: Oct. 17, 2007

(86) PCT No.: PCT/GB2007/003956
§ 371 (c)(1),
(2), (4) Date: Apr. 10, 2009

(87) PCT Pub. No.: WO2008/047114
PCT Pub. Date: Apr. 24, 2008

(65) Prior Publication Data
US 2010/0235166 A1    Sep. 16, 2010

(30) Foreign Application Priority Data
Oct. 19, 2006  (GB) .................................. 0620829.2

(51) Int. Cl.
*G10L 13/08*    (2013.01)
*G10L 13/00*    (2006.01)
*G10L 13/10*    (2013.01)

(52) U.S. Cl.
CPC .................................... *G10L 13/08* (2013.01);
*G10L 13/10* (2013.01)
USPC ......................................... 704/258; 704/269

(58) Field of Classification Search
CPC ................................ G10L 13/08; G10L 13/10
USPC .................................. 704/270, 275, 258, 260
See application file for complete search history.

(56) References Cited

U.S. PATENT DOCUMENTS 5,113,449 A * 5/1992 Blanton et al. ................ 704/261
5,630,017 A   5/1997 Gasper et al.
(Continued)

FOREIGN PATENT DOCUMENTS

GB      2370954     7/2002
JP   2001009157 A   1/2001
(Continued)

OTHER PUBLICATIONS

Preliminary Report on Patentability dated Jun. 10, 2009, for corresponding International Application PCT/GB2007/003956.
(Continued)

*Primary Examiner* — Jialong He
(74) *Attorney, Agent, or Firm* — Lerner, David, Littenberg, Krumholz & Mentlik, LLP (57) ABSTRACT A method of audio processing comprises composing one or more transformation profiles for transforming audio characteristics of an audio recording and then generating for the or each transformation profile, a metadata set comprising transformation profile data and location data indicative of where in the recording the transformation profile data is to be applied; the or each metadata set is then stored in association with the corresponding recording. A corresponding method of audio reproduction comprises reading a recording and a meta-data set associated with that recording from storage, applying transformations to the recording data in accordance with the metadata set transformation profile; and then outputting the transformed recording.

34 Claims, 5 Drawing Sheets (56) References Cited

U.S. PATENT DOCUMENTS

| | | | |
|---|---|---|---|
| 5,687,240 A * | 11/1997 | Yoshida et al. | 381/61 |
| 5,749,073 A * | 5/1998 | Slaney | 704/278 |
| 6,446,040 B1 * | 9/2002 | Socher et al. | 704/260 |
| 6,539,354 B1 * | 3/2003 | Sutton et al. | 704/260 |
| 7,065,490 B1 * | 6/2006 | Asano et al. | 704/275 |
| 7,379,872 B2 * | 5/2008 | Cabezas et al. | 704/260 |
| 7,478,047 B2 * | 1/2009 | Loyall et al. | 704/258 |
| 7,865,365 B2 * | 1/2011 | Anglin et al. | 704/258 |
| 7,983,910 B2 * | 7/2011 | Subramanian et al. | 704/250 |
| 2002/0173962 A1 * | 11/2002 | Tang et al. | 704/260 |
| 2003/0110026 A1 | 6/2003 | Minoru | |
| 2003/0158721 A1 * | 8/2003 | Kato et al. | 704/1 |
| 2003/0158728 A1 | 8/2003 | Bi et al. | |
| 2004/0143438 A1 * | 7/2004 | Cabezas et al. | 704/260 |
| 2004/0166918 A1 * | 8/2004 | Walker et al. | 463/16 |
| 2005/0065784 A1 * | 3/2005 | McAulay et al. | 704/205 |
| 2005/0223078 A1 * | 10/2005 | Sato et al. | 709/207 |
| 2006/0095265 A1 * | 5/2006 | Chu et al. | 704/268 |
| 2006/0136213 A1 * | 6/2006 | Hirose et al. | 704/260 |
| 2006/0143000 A1 * | 6/2006 | Setoguchi | 704/205 |
| 2006/0259303 A1 * | 11/2006 | Bakis | 704/268 |
| 2007/0233472 A1 * | 10/2007 | Sinder et al. | 704/219 |
| 2007/0233489 A1 * | 10/2007 | Hirose et al. | 704/258 |
| 2008/0147413 A1 * | 6/2008 | Sobol-Shikler | 704/278 |
| 2008/0235024 A1 * | 9/2008 | Goldberg et al. | 704/260 |

FOREIGN PATENT DOCUMENTS

| | | | |
|---|---|---|---|
| JP | 2001034282 A | 2/2001 | |
| JP | 2001333378 A | 11/2001 | |
| JP | 2002113262 A | 4/2002 | |
| JP | 2002351489 | 12/2002 | |
| JP | 2003036100 A | 2/2003 | |
| JP | 2004313767 A | 11/2004 | |
| JP | 2005065191 | 3/2005 | |
| JP | 2005210196 | 8/2005 | |
| JP | 2006079712 | 3/2006 | |

OTHER PUBLICATIONS

European Communication pursuant to Article 94(3) EPC dated Dec. 9, 2009, from the corresponding European Application.
http://manuals.info.apple.com/en/logic/Logic_Pro_7_Reference_Manual.pdf, section 7, 2004.
Notification of Transmittal of the International Preliminary Report on Patentability dated Oct. 17, 2008, for corresponding International Application PCT/GB2007/003956.
Notification of Transmittal of the International Search Report, The International Search Report and the Written Opinion of the International Searching Authority dated Feb. 21, 2008, for corresponding International Application PCT/GB2007/003956.
Combined Search and Examination Report under Sections 17 and 18(3) dated Sep. 25, 2007, for corresponding British Application GB0620829.2.
Japanese Office Action for Application No. 2009-532891 dated Mar. 12, 2013.
Japanese Office Action for Application No. JP2013-145999 dated Nov. 12, 2013.
Lawrence R. Rabiner, 'A Tutorial on Hidden Markov Models and Selected Applications in Speech Recognition', Proceedings of the IEEE, 77 (2), p. 257-286 Feb. 1989; in particular, p. 275-276.
Japanese Office Action for Application No. 2013-145999 dated Jun. 3, 2014.

* cited by examiner

APPARATUS AND METHOD FOR TRANSFORMING AUDIO CHARACTERISTICS OF AN AUDIO RECORDING

The present invention relates to an apparatus and method of audio processing. In particular, but not exclusively, it relates to apparatus and methods of audio processing and reproduction of recorded speech.

Recorded dialogue (a term which is used generically to refer to recorded contributions by one or more voices) in video games is becoming an increasingly important factor in the player's perception of game quality, as video game production values begin to converge with those of mainstream cinema. However, with a greater emphasis on dialogue comes both increased costs and increased scrutiny.

Increased costs arise in several ways: firstly, it is costly to hire and record acting talent—a cost compounded if the dialogue is to be recorded in different languages for different markets. Secondly, it is costly in terms of disk storage space and processing resources for a computer running the game. It would be advantageous to limit or reduce these costs if possible.

Increased scrutiny arises as the dialogue becomes essential to providing immersion, commentary, empathy, feedback and narrative to the player, resulting in a more rewarding game experience.

However, the dialogue in video games is subject to significant differences when compared to traditional recorded media.

One difference is that typically the total duration of play for a video game is many times longer than a television programme or film. Thus, to limit costs, the producer of a game may frequently consider re-using fragments of dialogue for similar situations within a game.

Another difference is that in general players of a game may need to repeat some section of the game action many times to successfully progress forward, or may need to revisit some central part of a game many times in order (for example) to trade objects or heal a character. Therefore, they may encounter the same dialogue many times over.

As a result, there is a tendency for considerable repetition of dialogue within recurring video game scenes. However, encountering the same recorded lines of dialogue over and over again can cause irritation, can give the impression of limited production value, and can break the illusion of reality in the game.

Consequently, a tension between the cost of the dialogue and its ability to satisfy the player is exacerbated by dialogue repetition in large and non-linear games.

An ideal solution to this problem would be to record numerous variations of each such line of dialogue, so that no matter how often it is heard by the user, it would sound different and natural each time. However, merely recording just a second version of each line could result in a doubling of costs in terms of actor's time, reproduction rights, recording time, and computer storage capacity. Recording a large number would be impractical.

Voice tools to modify recordings during production are known in the art. Typically, the facilities provided by these tools fall into two general categories. In the first category are tools that allow the regularisation or 'correction' of a person's voice—for example to correct the pitch of a person who sings a flat note. Such facilities may be found in known products such as Melodyne, PurePitch and Antares Autotune. In the second category are tools that allow the disguising or transformation a person's voice—for example for anonymity, or to create 'non-human' game or film characters. Such a facility may be found in products such as MorphVOX or TC-Helicon VoicePro. In a third, intermediate, category are tools to enhance a voice—for example, to provide harmonies that a person cannot naturally reach, or to accentuate or suppress pitch variations in a recording to enliven or temper a piece of dialogue.

Of these, clearly regularising a dialogue recording is likely to make the user's impression of it worse when used in a gaming scenario such as those described above. By contrast, a total transformation the characteristics of the voice actor could lead to confusion and break the illusion of reality in the game. Whilst the intermediate approach of varying the pitch envelope for different recorded versions of the dialogue may provide some superficial variation, it may be highly inappropriate for some dialogue and may not provide sufficiently natural variation when heard over a number of repetitions.

Moreover, whilst these tools may limit the cost of hiring voice-acting talent, they do not necessarily reduce cost in terms studio post-production time, and do not reduce cost in terms of occupying finite storage space in a player's computer, or on the game installation media.

Embodiments of the present invention seek to mitigate or alleviate the above problems.

Various respective aspects and features of the invention are defined in the appended claims. Features from the dependent claims may be combined with features of the independent claims as appropriate and not merely as explicitly set out in the claims.

In a first aspect of the present invention, a method of audio processing comprises the steps of composing one or more transformation profiles for transforming audio characteristics of an audio recording; generating, for the or each transformation profile, a metadata set comprising respective transformation profile data and location data indicative of where in the recording the transformation profile data is to be applied; and storing the or each metadata set in association with the corresponding recording.

By storing metadata sets with the recording, one or more additional interpretations of the recorded dialogue are accessible without the need for re-recording the dialogue in the studio, or pre-processing the recording and storing separate copies.

According to another aspect of the present invention, a method of audio reproduction comprises the steps of reading from storage a recording and a meta-data set associated with said recording, in which the meta-data set comprises a transformation profile; applying transformations to the recording data in accordance with said transformation profile; and outputting the transformed recording.

By applying transformations to the recording according to the transformation profile of a selected metadata set, the original recording can be re-interpreted upon playback without the need to store additional or pre-processed recordings.

According to another aspect of the present invention, an audio processing apparatus comprises composition means, metadata set generation means and storage writing means, enabling it to carry out the above method of audio processing in operation.

According to another aspect of the present invention, an audio reproduction apparatus comprises storage reading means, transformation processing means and audio output means, enabling it to carry out the above method of audio reproduction in operation.

According to another aspect of the present invention, a data carrier comprises computer readable instructions that enable a computer to carry out the above method of audio processing in operation.

According to another aspect of the present invention, a data carrier comprises computer readable instructions that enable a computer to carry out the above method of audio reproduction in operation.

According to another aspect of the present invention, a data carrier comprises an audio recording and at least a first metadata set associated with said audio recording, the metadata set being generated by the above method of audio processing.

Embodiments of the present invention will now be described by way of example with reference to the accompanying drawings, in which.

An apparatus and method of audio processing are disclosed. In the following description, a number of specific details are presented in order to provide a thorough understanding of embodiments of the present invention. It will be apparent, however, to a person skilled in the art that these specific details need not be employed to practise the present invention. Conversely, specific details known to the person skilled in the art are omitted for the purposes of clarity in presenting the embodiments.

Embodiments of the present invention enable recorded dialogue to be varied in real time upon playback, the variation optionally being responsive to game-based parameters. For example, the phrase 'get out [of] the car' may be said by recognisably the same character either urgently or calmly, according to the in-game situation, based upon a single recorded version of the dialogue.

Figure 1A:
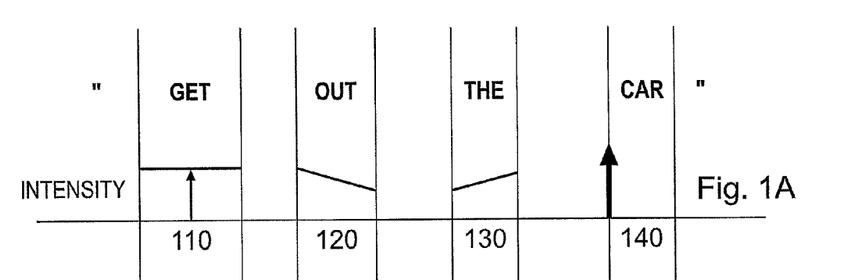
FIGS. 1a, 1b and 1c are schematic diagrams of transformation profile elements being composed for a recording, in accordance with an embodiment of the present invention.
Figure 1B:
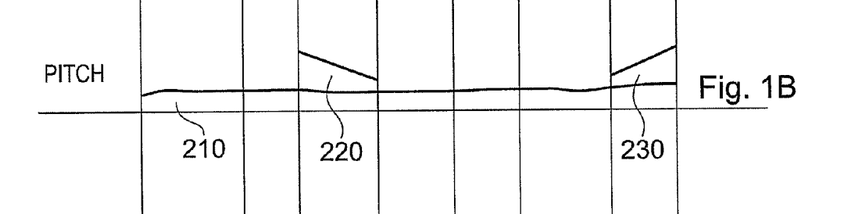
Figure 1C:
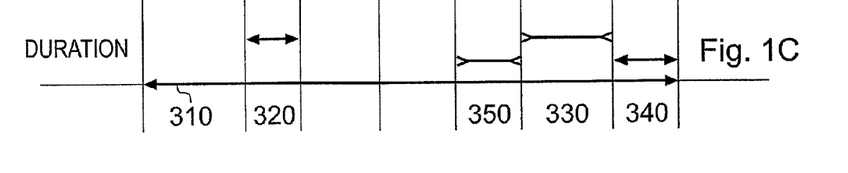

Referring to FIGS. 1a, 1b and 1c, in an embodiment of the present invention, characteristics of a recorded dialogue are considered on a per-syllable basis. For the depicted example sentence 'Get out [of] the car', variations in amplitude (or intensity), pitch and duration are considered. Time extends along the horizontal axis of all three figures at the same scale. The vertical lines extending between the three figures demarcate the beginnings and endings of the individual words. Within FIGS. 1a and 1b the vertical axis schematically represents a value of the relevant parameter—amplitude or pitch.

FIG. 1a illustrates variations that can be applied to the intensity, or amplitude of the spoken sentence.

Amplitude may be varied as follows:
i. Uniform gain control 110 over a syllable;
ii. Variable envelope gain control (120, 130) over a syllable, and/or;
iii. A short term (hereafter 'point') gain control 140 within a syllable—typically at the beginning or end, with the rest of the syllable remaining unchanged or (not shown) subject to one of the variations i. or ii. listed above.

Typically, the uniform gain control 110 may be applied to the whole line of dialogue, possibly in addition to syllable-based control.

Alternatively or in addition, a variable gain envelope (120, 130) may be applied. A set of predefined envelopes may be provided, including ramp up, ramp down and early, middle and late peak (a peaked envelope provides a smooth boost in amplitude both up and back down, shaped to emphasise a short section of the envelope). These envelopes may be used to change the emphasis of a word or syllable.

Alternatively or in addition a point gain control 140 may be applied. A point control is a short-duration gain envelope (typically tens of milliseconds) applied to the start or end of a syllable. These may be used to emphasise a plosive or fricative, for example to give a feeling of exasperation or sarcasm to the dialogue. Optionally, the length of duration may be controllable within a predefined range.

Uniform gain, predefined envelopes and point gain controls are adjustable by use of appropriate parameters, such as ramp angle or peak width.

FIG. 1b illustrates variations that can be applied to the pitch of the spoken sentence.

Pitch may be varied as follows:
i. Uniform pitch control 210 by syllable or (as shown) by line, and/or;
ii. Variable envelope pitch control (220, 230) by syllable.

Typically, uniform pitch control 210 may be applied to the whole line of dialogue, although it will be appreciated that it can be applied either to a whole word or an individual syllable.

Alternatively or in addition, a pitch envelope (220, 230) may be applied. A set of predefined envelopes may be provided, including ramp up, ramp down and early, middle and late peak. When applied to a syllable (particularly a final syllable), these may be used for example to change a line of dialogue between a question and a statement. Again, pitch control is adjustable by use of appropriate parameters.

FIG. 1c illustrates variations that can be applied to the duration of the spoken sentence.

Duration may be varied as follows:
i. Lengthening (340) or shortening (350) of a syllable
ii. Lengthening (320) or shortening (330) of an inter-word gap Lengthening or shortening of a syllable (340, 350) may be linear or non-linear. Non-linear alteration may be facilitated by a set of profiles to variously compress and/or expand different parts of a syllable to different extents, for example stretching the early, middle or late parts of a syllable. These may be used for example to slur or drawl a word or to emphasise a vowel. Again, duration control is adjustable by use of appropriate parameters.

Alternatively or in addition, a more general lengthening or shortening of a whole word, or a line of dialogue (310), may be similarly performed.

Lengthening or shortening (320, 330) of inter-word gaps allows an alteration in the cadence of a sentence. This may be used to convey urgency, relaxation or emphasis, or to add dramatic pauses.

It will be clear to a person skilled in the art that more than one of the above variations can be applied simultaneously.

It will be appreciated, however, that independent alteration of the pitch and the duration requires appropriate signal processing.

In an embodiment of the present invention, a wavelet-based process is applied to a portion of the recording to independently alter the pitch or duration of a syllable.

In traditional sampling systems, alteration of a signal's duration results in an alteration in frequency, and vice versa. This is because the pitch is determined by the playback rate.

A more sophisticated technique could use Fourier transformation. A Fourier transform exploits the property that, in principle, any sound wave can be synthesised from a superposition of sine waves of different frequencies. A Fourier transform converts a sound wave in time into a series of sine waves of different frequencies, whose amplitude and phase are such that they would constructively and destructively interfere with each other to recreate the sound wave. The pitch of the sound wave can then be altered by shifting the frequency offset of the series of sine waves before inverse Fourier transformation to resynthesise the sound.

However, this again alters the duration of the sound. This is because the Fourier transform assumes sine waves of infinite duration—i.e. it is only localised in frequency. In practice, Fourier synthesis is typically applied to overlapping periods of sound, each representing typically about 100 milliseconds. Consequently, whilst the overall duration of the sound can be preserved, it is composed of resynthesised sequences that no longer properly overlap, and audible artefacts are generated as a result.

By contrast, so-called wavelet transforms use a series (or 'family') of wavelets that are localised both in frequency and duration (e.g. windowed sine waves).

Consequently, following a wavelet transformation, alterations in frequency can be accompanied by compensatory alterations in duration to allow a pitch change whilst preserving the duration, and vice versa. Indeed, changes to both pitch and duration (factoring in the effect of one upon the other) can be performed simultaneously prior to inverse wavelet transformation to resynthesise the sound.

It will be apparent to a person skilled in the art that similar time-frequency transforms, such as so-called chirplet transforms, may also be applicable.

In another embodiment of the present invention, a transformation known as "Pitch Synchronous Overlap Add" (PSOLA) is used—see 'DAFX—Digital Audio Effects' by Udo Zölzer et. al., and published by Wiley, ISBN: 0-471-49078-4.

Initially, PSOLA determines the pitch period in the time domain (for example, the fundamental pitch in voiced speech) at a particular point.

The fundamental pitch can then be adjusted by selecting segments of the time history of lengths equal to one pitch period, cross-fading them either closer together further apart, thereby changing the effective pitch.

Advantageously this change in pitch can be implemented independently of lengthening or shortening the signal; to alter the duration, overlapping segments of the signal of lengths equal to one or more pitch periods are then selected. These segments are then cross-faded by one or more multiples of the pitch period, thereby, shortening or lengthening the time history of the signal without raising or lowering the apparent pitch contained therein.

Alternatively, the two steps of duration and pitch alteration can be implemented simultaneously, by either the omission of or multiple use segments of the time history of lengths equal to one pitch period when cross-fading them to achieve the desired pitch.

This method also has the benefit of being computationally simple. Whilst potentially there is a problem with audio files with multiple tones and hence multiple pitch periods (such as in music), voiced speech tends to comprise a single fundamental pitch and harmonics in relative fixed phase. Consequently the method is generally applicable to speech.

In another embodiment of the present invention, the pitch and duration of recorded dialogue is altered by a physical modelling technique known as source-filter synthesis. In source-filter synthesis, the recorded speech is treated as a combination of a glottal source signal that is filtered over time by the (changing) resonances of the vocal tract.

The equivalent filter and the glottal source signal can be separately derived from recorded dialogue using a linear predictive coding technique.

Duration independent pitch shifting that does not significantly affect formant structure (or that can be considered as constrained to avoid any significant change to formant structure) can then be achieved by altering the pitch of the glottal source signal, and then reapplying the determined equivalent filter.

In addition to pitch optionally other manipulations may be applied to the glottal source signal, including any or all of:
  i. Growl and rasp associated with vocal cord damage
  ii. Breathiness
  iii. Vibrato In the first case, growl and rasp may be used to reflect damage to an in game character, or to suggest for example that a character was a heavy smoker, and may be implemented for example by applying a distortion effect to the glottal source signal within source-filter synthesis.

In the second case, breathiness may be used to reflect when the character is approaching an enemy or is at risk of discovery, and may be varied from normal vocalisation to a whisper by for example mixing the glottal source signal with a suitably shaped noise signal as appropriate.

In the third case, vibrato may be applied by applying a low-frequency pitch oscillation to the glottal source signal.

Where a number of parameters are available to control such qualitative manipulations of the dialogue, they may either be separately controllable, or alternatively grouped in a pre-arranged manner to give, for example, such effects as soft growl or harsh rasp.

Furthermore in each case, different envelopes for levels of growl, breathiness and vibrato may be pre-set just as described for amplitude, pitch and duration. Likewise, they may be applied to individual syllables, whole words or whole lines of dialogue.

It will be appreciated by a person skilled in the art that other modifications to the glottal source signal are envisaged as appropriate, such as a chorus effect.

Likewise, slight modifications to the resonant characteristics of the equivalent filter are also possible, for example to make the voice sound nasal.

Figure 2:
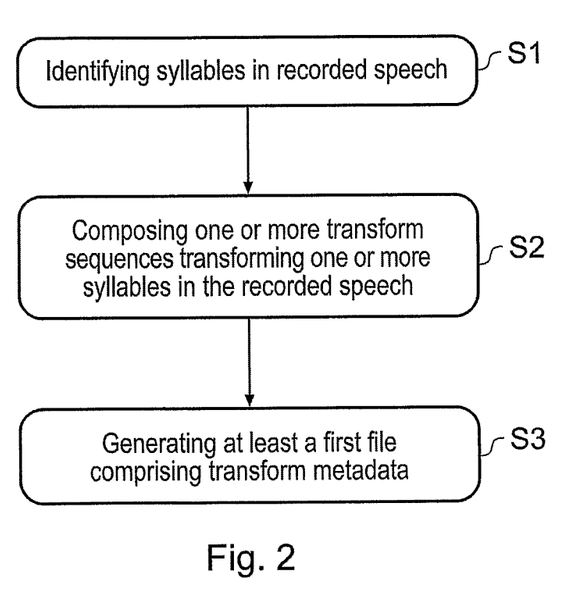
FIG. 2 is a schematic flow diagram of a method of audio processing in accordance with an embodiment of the present invention.

Referring now also to FIG. 2, in an embodiment of the present invention, a method of generating transform metadata to accompany recorded speech comprises the steps of:
  i. Identifying (S1) syllables in the recorded speech;
  ii. Composing (S2) one or more transformation profiles for transforming one or more syllables in the recorded speech, the transformation profile(s) defining one or more alterations such as the ones described above, and;
  iii. Generating (S3) at least a first file comprising transform metadata, the transform metadata preferably comprising one or more time locators for portions of the recorded speech and indicators for which transformation(s) (alterations) to apply at those located times.

In an embodiment of the present invention, the syllables are identified (i.e. singled out or segmented) by use of a suitably trained Hidden Markov Model (HMM). See, for example, Lawrence R. Rabiner, 'A Tutorial on Hidden Markov Models and Selected Applications in Speech Recognition', Proceedings of the IEEE, 77 (2), p. 257-286, February 1989; in particular, p. 275-276.

HMMs comprise a series of 'states' representing characteristics of some observed phenomena. The HMM then builds a statistical model of the likelihood of staying in one state or shifting to another that best represents the behaviour of the observed phenomena.

In an embodiment of the present invention, the states use a frequency representation of the input sound, and each HMM models the evolution of the frequency representation for a given syllable. Syllables are then identified by determining which HMM has built a state machine with the highest probability of reproducing the observed sound, using well known search algorithms.

It will be appreciated by a person skilled in the art that other known learning classification systems such as artificial neural networks may be used instead of HMMs.

In another embodiment of the present invention, frequency analysis is used to determine when voiced vowels are present in the speech. Voiced speech generates a series of evenly spaced harmonic frequencies, which can be detected by a comb filter. Comb filters are a series of detectors similarly evenly spaced in frequency; by adjusting the spacing until a strong signal is found across the filter set, the pitch separation of the harmonics (and thus also the fundamental pitch of the voice) can be found. However, consonants, plosives and glottal stops disrupt the harmonic structure generated by vowels, and this change can be used to approximate syllable positions on the basis that in general a syllable is centred around a voiced vowel (or pseudo-vowel such as 'y'). A detection of such a set of harmonics (i.e. a set matching a vowel of this nature) can be used therefore to identify a position within a syllable. If a series of such positions is obtained in an otherwise continuous audio file section (i.e. a section corresponding to a word), the length of that section can be simply divided by the number of detected syllables as an approximation of a division into individual syllables.

It will be appreciated by a person skilled in the art that, optionally and as applicable, elements of such an analysis may be shared with the pitch synchronous overlap add function to reduce overall computational load.

In addition, periods of comparative quiet between and within words are indicative of syllable boundaries and can be easily detected by use of an amplitude threshold. For example, a threshold may be set by determining the mean amplitude in the first few tens of milliseconds of a recorded dialogue (in which typically no speech is uttered), and then setting the threshold to be a multiple of this amplitude. Alternative voice activity detection methods are also known in the art.

However, it will be appreciated by a person skilled in the art that predefined intensity, pitch, duration and other transformation profile elements may span more than one syllable. For example, word-based profiles are envisaged within the scope of the present invention. Consequently, syllable-level identification will not be necessary in such embodiments.

A uniform, point or envelope alteration to intensity, pitch or duration, or a qualitative alteration such as growl, breathiness or vibrato, when applied over one syllable or word may for convenience be referred to as a profile element of the overall transformation profile.

In an embodiment of the present invention, when composing transformation profiles, constraints are applied in order to limit discontinuities. For example, if a ramp-up pitch profile element is applied to a first syllable, whilst a uniform pitch reduction is applied to the next syllable, an undesirable jump in pitch may occur. In such circumstances, the pitch profile elements may be interpolated between the syllables so as to avoid exceeding a defined pitch gradient threshold. Consequently, the greater the apparent change in pitch, the more the period of interpolation will encroach on each syllable to provide a smooth transition. Optionally, the pitch gradient threshold may be user-definable, and likewise interpolation may be overridden either globally or for a specific profile element pair.

Similar constraints may be applied to variations in amplitude or duration.

Significantly, the modifications applied are also constrained to ensure that the relative formant frequency distribution within the recorded dialogue is largely preserved, making the modified dialogue recognisable as using the same voice.

Notably, the PSOLA method maintains the relative formant structure because pitch-shifting is achieved by altering the frequency of occurrence of the periodic segments used within the signal, rather than changing their sampling rate; consequently the periodic segments retain their original spectral envelope.

Likewise, physical modelling does not significantly affect formant structure because the pitch of the glottal source signal can be altered independently of the filtration by the vocal tract.

Referring again to FIGS. 1a and 1b, alternatively or in addition, some or all of each of the intensity, pitch and other transformation profiles may be user-defined using a freehand interface to define the transformation profile shape. As such, this provides effective continuity across syllable boundaries.

The transformation profiles, based on profile elements and/or free-hand profiles, are then associated with the recorded dialogue as a set of metadata. This can be stored in association with the audio data in a variety of known ways, such as (a) in the form of a linked metadata file, preferably stored on the same recording medium; (b) as a pre-amble or post-amble to the relevant audio data; (c) in so-called user bits or user data areas forming part of the audio data format and so on.

In the case of transformation profiles based on the predefined profile elements outlined previously, this may take the form of a list of profile elements to apply, each with any appropriate parameter data, together with timing data defining at least start points for each within the dialogue and/or within an overall recorded audio file. In this regard, however, it is noted that in-game dialogue is often stored in the form of individually accessible files, one for each line or small group of lines of dialogue (as is the case in the worked example below). The timing information may be recorded as numbers of seconds, numbers of samples, byte or word offsets or the like. Alterations may be specified by any suitable format such as decibels (dB) of gain, sample multipliers, pitch multipliers etc, along with (where appropriate) a specification of the type of alteration (e.g. amplitude ramp up). Typically each alteration will have various parameters associated with it. In the following example time is measured by video frames (minutes:seconds:frames) as an offset from the start of the audio file. It will be seen that the type of transformation dictates the nature of the specifying data which must be included to define that transformation. These data (defining the transformations) may be considered as transformation profiles, or, once embodied as metadata, as metadata defining the transformation profiles. Each transformation in these examples refers to a predefined profile element (e.g. "amplitude ramp") selected (for example) by the user from a list or set of available transformations, but, as discussed below, freehand transformations can also be defined. Emotion tags (as shown below), e.g.

from a list of available emotion tags, can also be included within the metadata to indicate an emotion conveyed by each transformation. A notional "degree" of that emotion being intimated can also be included. This is on an arbitrary, though predetermined, scale and allows the transformation to be modified (e.g. emphasised) within a game environment if a different degree of that emotion needs to be conveyed.

```
Sound_file_1
    Transformation_1
        start_time:      00:00:00
        end_time:        00:10:00
        type:            amplitude ramp
        start_gain:      0dB
        end_gain:        10dB
        emotion:         surprise/degree=10
    Transformation_2
        start_time:      00:01:00
        end_time:        00:02:23
        type:            constant pitch change
        pitch_mult       1.2
        emotion:         excitement/degree=3
    Transformation_3
        etc ...
Sound_file_2
    Transformation_1
        etc ...
```

It will be appreciated that the parameters set out above may be adjustable by a user. It will also be appreciated that the periods of time over which the transformations are defined are selectable by a user or may be determined by a process of detecting syllables and/or lines.

As mentioned above, each line of dialogue may be recorded as a separately accessible file or file-part. Alternatively, a larger portion of dialogue can be divided into lines by a machine-detection of inter-word spaces (gaps) using a simple amplitude threshold to distinguish between words and non-words. If an inter-word gap occurs which is significantly longer (e.g. 3 times longer) than the average inter-word gap, an arbitrary decision can be made that such a gap represents the start of a new line of dialogue.

For free-hand (user-defined) profiles (created, for example, using a graphics tablet via an editing interface), these may be approximated by curve-fitting, and the resulting curves, in the form of splines or the like are represented parametrically in a similar fashion to the profile elements. Alternatively, free-hand profiles may be sampled at a comparatively low sample rate (for instance every 5 ms, but in principle at whatever rate provides acceptable modifications to the user), for reconstruction at playback.

For audio data that can be carried in a Resource Interchange File Format (RIFF), such as for example a Microsoft Wave file using uncompressed pulse-code modulated audio data, a RIFF file allows the embedding of metadata using a four character code (FCC) format. An example metadata format for transformation profiles is given below.

| | |
|---|---|
| [FCC="RIFF"][size of chunk][FCC="WAVE"] | // Standard RIFF-WAVE header |
| [FCC="LIST"][size of chunk][FCC="dpsp"] | // List of detected pitch-synchronous points |
| [FCC="dpin"] [size of chunk] <Custom meta> | |
| [FCC="dpin"] [size of chunk] <Custom meta> | |
| [FCC="dpin"] [size of chunk] <Custom meta> | |
| : | |
| <EndOfFile> | |

The <Custom meta> fields then contain timing data, in terms of sample offsets, and profile element data.

Alternatives to RIFF files include, for example, extended mark-up language (XML) encoding of the data and metadata.

It will be appreciated by a person skilled in the art that such metadata sets may be embedded adjacent to the recording dialogue as in the RIFF example above, or may be interleaved or encoded with it, or may be separate objects associated with it via a look-up table or the like.

A plurality of metadata sets, each representing a different transformation profile for modifying the recorded dialogue, may be associated with a recording.

In addition, the metadata set for each modification may comprise one or more tags to indicate the type of emotion that the modification imbues within the recorded dialogue. Such tags may identify a specific emotion such as 'excited' or 'afraid', and/or may indicate where on a positive/negative emotional scale the modification lies. Optionally, these tags will conform to a standard set so that they can be easily identified by a standardised software library used by a game during playback.

Figure 3:
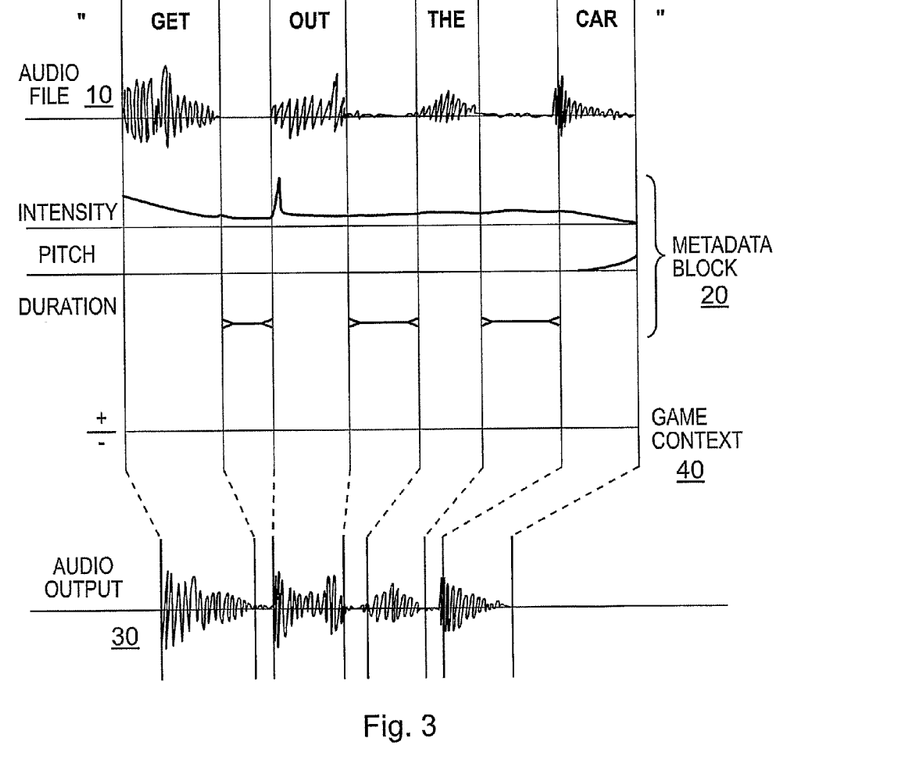
FIG. 3 is a schematic diagram of transformation profile elements being applied to a recording, in accordance with an embodiment of the present invention.

Referring now to FIG. 3, during playback in-game, an audio file 10 comprising a dialogue recording and an associated metadata set 20 are selected.

Optionally, the metadata set is selected from among a plurality of associated metadata sets according to its emotion tag or tags, dependent upon current parameters of the game such as overall success or character strength. For example, if the player's character is doing poorly, then a metadata set tagged with a negative emotional scale value may be selected. Likewise, in a scripted in-game event, the approach of a scary monster may result in selection of a metadata set with a 'scared' tag.

A combination approach is also envisaged; for example, if the player's character is doing well, then rather than select a metadata block with a 'scared' tag, the game may select one with an 'excited' tag when the monster appears. In this case, 'excited' and 'scared' are script-appropriate options corresponding to positive and negative emotional scale values, the evaluation of which is based on in-game parameters at the time of the scripted event.

Likewise, multiple emotion tags corresponding to different parts of a single recording are envisaged, with associated time stamps indicating where in the recording the emotions change.

In FIG. 3, an audio file is read, and the corresponding metadata also accessed. The data in the audio file 10 is adjusted as described previously according to the transformation profile in the metadata set and then played as an audio output 30.

Alternatively or in addition, parameters from the game, a scripted event in the game or a combination of the two as outlined above can be used to further modify the transformation profile in the selected metadata set, thereby providing a game-dependent context 40. For example, if the available metadata sets do not cover the desired emotional scale value exactly, then changes to the transformation profile parameters in the metadata can be applied accordingly. For example, if a metadata set modifies a dialogue recording to make a voice sound slightly tired, but the game character is now exhausted, then profile element parameters in the metadata could be multiplied in proportion to the extent to which the character is tired, to extrapolate the existing modification and make the voice sound more tired. Likewise, parameters may be interpolated between metadata sets to better approximate the in-game emotional level.

Similarly, in an embodiment of the present invention the game applies a slight random variation to the parameters within the metadata set, prior to modification of the recorded dialogue. This reduces the likelihood of all the in-game parameters being identical and thus applying an identical modification, for example when repeatedly re-loading a saved game at the same point.

Optionally, the degree of random variation may be a function of how recently the game was started (reloaded) from a saved game position; thus for example, the first dialogue output after recommencing a game may be subject to considerable random variation, the second dialogue to much less, and the third to hardly any. This mitigates the most annoying repetitions of dialogue to a player, whilst avoiding emotional subtleties in modification being overwhelmed by random variation as a matter of course. It will be clear to a person skilled in the art that the random variation may also simply be a function of time from re-load instead. It will similarly be clear that the degree of random variation may refer to the number of profile elements affected and/or the amount by which the profile elements are changed. Likewise, it will also be clear that such random variation can be applied in the absence of a selected metadata set, by random composition and parameterisation from some or all of the available predefined profile elements.

In an embodiment of the present application, lip synchronisation of in-game characters is implemented with respect to the recorded dialogue. Consequently, any selected metadata information comprising duration profile elements is used to modify the lip sync pattern to fit the modified dialogue. For example, an increase or decrease in amplitude in respect of a particular syllable should be accompanied by a widening or reduction of a game character's open mouth when that syllable is replayed. An increase in pitch could be accompanied by a lateral narrowing of the character's open mouth. A change in duration of a syllable would change the duration over which the character's mouth is open, and so on.

Optionally, in addition any or all of the selected intensity, pitch and emotion tag metadata may also be passed to the lip sync process (and facial animation process, if separate) within the game.

The intensity and pitch metadata may then be used to modify the lip and/or face movements of the character to reflect the intensity and pitch of the modified dialogue associated with them, so providing visual variability corresponding to the audio variability provided by the metadata.

Similarly, the emotion tag or tags may be used to select an overall facial expression to then be modified by the lip-sync process. Again, this may be based on distinct emotion types such as 'happy' or 'scared', or an emotion scale value, or a combination of the two if both are present.

Figure 4:
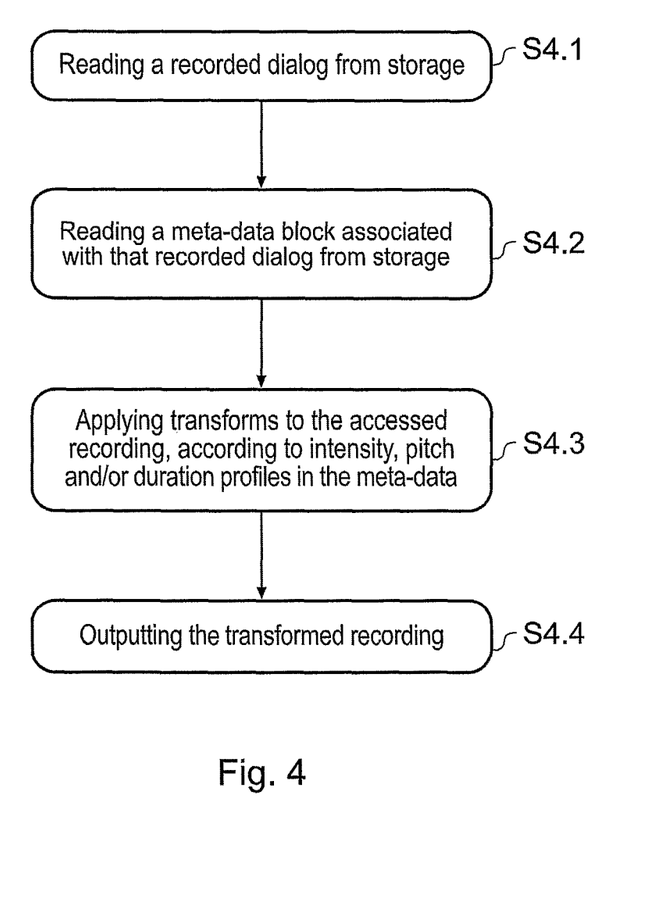
FIG. 4 is a schematic flow diagram of a method of audio reproduction in accordance with an embodiment of the present invention.

Referring now to FIG. 4, in summary therefore a method of generating a modified dialogue from a recording comprises the steps of:
  i. reading (S4.1) a recorded dialogue from storage;
  ii. reading (S4.2) a metadata set associated with that recorded dialogue from storage;
  iii. applying (S4.3) transforms to the accessed recording, according to intensity, pitch and duration profiles in the metadata; and
  iv. outputting (S4.4) the transformed recording.

The method optionally may also comprise one or more further steps or modifications to the above steps:
  v. selecting which associated metadata set is to be read from storage according to the degree of correspondence between emotion data in the metadata set and in-game parameters;
  vi. adjusting any or all of the intensity, pitch and duration transformation profiles extracted from the selected metadata to better correspond with in-game parameters; and
  vii. passing any or all of the intensity, pitch, duration and emotion information to those graphic processes responsible for animating the face of the character who is delivering the recorded dialogue.

Figure 5:
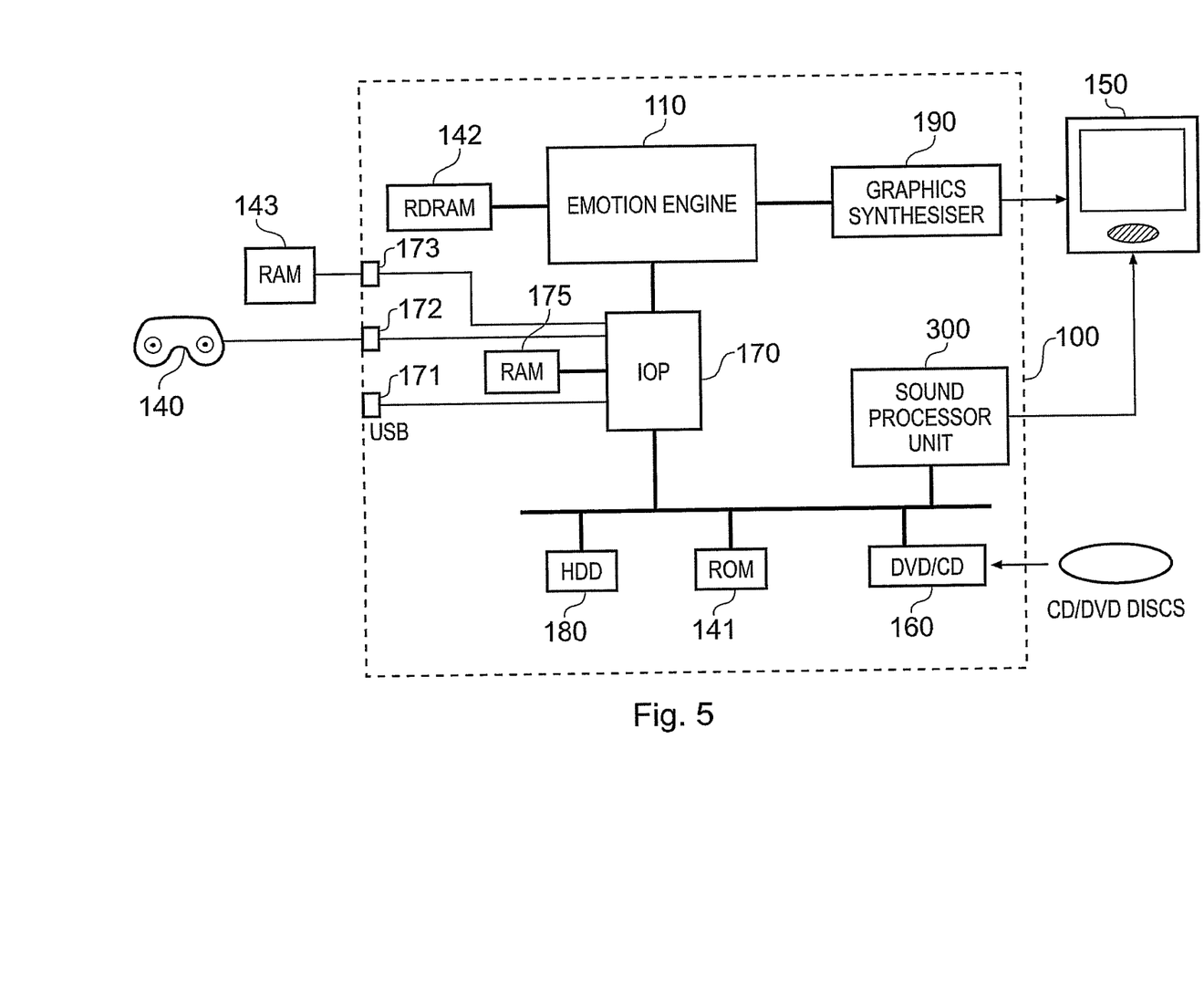
FIG. 5 is a schematic diagram of an entertainment apparatus in accordance with an embodiment of the present invention.

Referring now to FIG. 5, a summary schematic diagram of an embodiment of an entertainment apparatus 100 according to the present invention is given. The entertainment apparatus 100 can be provided with various peripheral devices connectable to the system unit.

The entertainment apparatus 100 comprises: an Emotion Engine 110; a Graphics Synthesiser 190; a sound processor unit 130 having dynamic random access memory (DRAM); a read only memory (ROM) 141; a compact disc (CD) and digital versatile disc (DVD) reader 160; a Rambus Dynamic Random Access Memory (RDRAM) unit 142; an input/output processor (IOP) 170 with dedicated RAM 175. An (optional) external hard disk drive (HDD) 180 may be connected.

The input/output processor 170 has two Universal Serial Bus (USB) ports 171 and an iLink or IEEE 1394 port (iLink is the Sony Corporation implementation of IEEE 1394 standard). The IOP 700 handles all USB, iLink and game controller data traffic. For example when a user is playing a game, the IOP 170 receives data from the game controller and directs it to the Emotion Engine 110 which updates the current state of the game accordingly. The IOP 170 has a Direct Memory Access (DMA) architecture to facilitate rapid data transfer rates. DMA involves transfer of data from main memory to a device without passing it through the CPU. The USB interface is compatible with Open Primary Controller Interface (OHCI) and can handle data transfer rates of between 1.5 Mbps and 12 Mbps. Provision of these interfaces mean that the entertainment apparatus 100 is potentially compatible with peripheral devices such as video cassette recorders (VCRs), digital cameras, microphones, set-top boxes, printers, keyboard, mouse and joystick.

Apart from the USB ports, two other ports 172, 173 are proprietary sockets allowing the connection of a proprietary non-volatile RAM memory card 143 for storing game-related information, a hand-held game controller 140 or a device (not shown) mimicking a hand-held controller, such as a dance mat.

The Emotion Engine 110 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 190. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 110 can asynchronously generate multiple display lists.

The Graphics Synthesiser 190 is a video accelerator that performs rendering of the display lists produced by the Emotion Engine 110. The Graphics Synthesiser 190 includes a graphics interface unit (GIF) which handles, tracks and manages the multiple display lists. The rendering function of the Graphics Synthesiser 190 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 190 of the primary entertainment device 100 provides the pixel logic and the video memory on a single high-performance chip, which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 190 is capable of rendering a film-quality image.

The Sound Processor Unit (SPU) 130 is effectively the soundcard of the system which is capable of recognising 3D digital sound such as Digital Theater Surround (DTS®) sound and AC-3 (also known as Dolby Digital) which is the sound format used for digital versatile disks (DVDs).

A display and sound output device 150, such as a video monitor or television set with an associated loudspeaker arrangement, can be connected to receive video and audio signals from the graphics synthesiser 190 and the sound processing unit 130.

The main memory supporting the Emotion Engine 110 is the RDRAM (Rambus Dynamic Random Access Memory) module 142 produced by Rambus Incorporated. This RDRAM memory subsystem comprises RAM, a RAM controller and a bus connecting the RAM to the Emotion Engine 110.

It will be appreciated that in embodiments of the present invention, steps of the method of generating transform metadata to accompany recorded speech and the corresponding elements of the method of generating a modified dialogue from a recording may be located in such an entertainment apparatus as described herein, or a similar general purpose computer, in any suitable manner. For example, a first general purpose computer may implement the method of generating transform metadata to accompany recorded speech, which is then stored on an optical medium before being input by an entertainment apparatus 100 operable to implement the method of generating a modified dialogue from a recording. It is expected that another suitable entertainment apparatus 100 will be the Sony® Playstation 3® entertainment machine.

Consequently the present invention may be implemented in any suitable manner to provide suitable apparatus or operation. In particular, it may be formed by adapting existing parts of an entertainment apparatus 100 or similar general purpose computer, such as by software reconfiguration.

Thus adapting existing parts of a conventional entertainment apparatus 100 or similar general purpose computer may comprise for example reprogramming of one or more processors therein. As such the required adaptation may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

Similarly, the product of the method of generating transform metadata to accompany recorded speech may be incorporated within a game, or transmitted during a game, and thus may take the form of a computer program product comprising processor-readable data stored on a data carrier such as a floppy disk, optical disk, hard disk, PROM, RAM, flash memory or any combination of these or other storage media, or may be transmitted via data signals on a network such as an Ethernet, a wireless network, the internet, or any combination of these or other networks.

Finally, it will be clear to a person skilled in the art that embodiments of the present invention may variously provide some or all of the following advantages:
  i. mitigating the need to re-record dialogue;
  ii. mitigating the need to pre-process dialogue in-studio;
  iii. mitigating the need to store additional versions of a dialogue on a storage medium;
  iv. enabling the selection of a dialogue transform according to in-game circumstances;
  v. enabling variation in output dialogue to reduce apparent repetitiveness; and
  vi. enabling modification of in-game characters to reflect the emotional content of reproduced dialogue.

The invention claimed is:
1. A method of audio processing comprising the steps of:
  composing one or more transformation profiles for transforming audio characteristics of an audio recording;
  generating, for each of the one or more transformation profiles, a metadata set comprising respective transformation profile data and location data indicative of where in the recording the transformation profile data is to be applied;
  storing each metadata set in association with the corresponding recording;
  selecting which associated metadata set is to be read from storage according to a degree of correspondence between emotion data in the metadata sets and one or more current emotion parameters in an application;
  applying random variations to the emotion data in the selected metadata sets;
  prior to composing the one or more transformation profiles, identifying locations of speech syllables in the recording; and
  adjusting one or more of intensity, pitch and duration transformation profiles extracted from the selected metadata.

2. A method of audio processing according to claim 1 in which each transformation profile comprises at least one sequence of predefined profile elements whose parameters are adjustable by a user.

3. A method of audio processing according to claim 2 in which at least one of the predefined profile elements is selected from a list consisting of:
  i. uniform alteration of amplitude, pitch or duration;
  ii. ramp-up change in amplitude or pitch;
  iii. ramp-down change in amplitude or pitch;
  iv. peaked change in amplitude or pitch; v. point change in amplitude; and
  vi. non-linear alteration in duration.

4. A method of audio processing according to claim 1 in which each transformation profile comprises at least one user-defined profile.

5. The method of claim 1, further comprising interpolating pitch profile elements between the speech syllables to avoid exceeding a defined pitch gradient threshold.

6. A method of audio processing according to claim 1 in which identifying the locations of speech syllables in the recording is performed by a hidden Markov model.

7. A method of audio processing according to claim 1 in which identifying the locations of speech syllables in the recording is performed by a comb filter, the comb filter being configured to detect instances of voiced harmonics.

8. A method of audio processing according to claim 1, further comprising selecting a predefined profile element for use in a given one of the one or more transformation profiles to be applied to a segment of the recording corresponding to a given one of the identified syllables.

9. A method of audio processing according to claim 1, further comprising arranging recorded dialogue into lines.

10. A method of audio processing according to claim 1, further comprising constraining each transformation profile to substantially maintain a relative formant structure of speech within the recording upon transformation.

11. A method of audio processing according to claim 1 in which the metadata set further comprises at least a first tag indicative of an emotion conveyed by the recording when modified according to the transformation profile of the metadata set.

12. A method of audio processing according to claim 11 where the first tag indicates one or more selected from a list consisting of:
  i. an emotion state within a preset list of emotion states; and
  ii. a value on a scale indicating the positive or negative extent of an emotion state.

13. A method of audio processing according to claim 1, further comprising:
  reading, from storage, the recording and the metadata set;
  applying transformations to the recording in accordance with the one or more transformation profiles to obtain a transformed recording; and
  outputting the transformed recording.

14. Audio processing apparatus, comprising:
  composition means for composing one or more transformation profiles for transforming audio characteristics of an audio recording;
  metadata set generation means for generating, for each of the one or more transformation profiles, a metadata set comprising respective transformation profile data and location data indicative of where in the recording the transformation profile data is to be applied;
  storage writing means for storing each metadata set in association with the corresponding recording, and
  means for selecting which associated metadata set is to be read from storage according to a degree of correspondence between emotion data in the metadata sets and one or more current emotion parameters in an application and for applying random variations to the emotion data in the selected metadata sets;
  the audio processing apparatus being configured to, prior to composing the one or more transformation profiles, identify locations of speech syllables in the recording and adjust one or more of intensity, pitch and duration transformation profiles extracted from the selected metadata.

15. A method of audio reproduction, comprising the steps of:
  reading from storage a recording and a metadata set associated with said recording, in which the metadata set comprises a transformation profile, the metadata set being read from storage according to a degree of correspondence between emotion data in the metadata set and one or more current emotion parameters in an application;
  applying random variations to the emotion data in the metadata set;
  identifying locations of speech syllables in the recording;
  applying transformations to the recording in accordance with said transformation profile, including adjusting one or more of intensity, pitch and duration transformation profiles extracted from the read metadata; and
  outputting the transformed recording.

16. A method of audio reproduction according to claim 15 in which transformations are applied to one or more characteristics of the recording selected from a list consisting of:
  i. amplitude;
  ii. pitch; and
  iii. duration.

17. A method of audio reproduction according to claim 15 in which the transformation profile comprises one or more predefined profile elements, wherein at least some of the predefined profile elements are selected from a list consisting of:
  i. uniform alteration of amplitude, pitch or duration;
  ii. ramp-up change in amplitude or pitch;
  iii. ramp-down change in amplitude or pitch;
  iv. peaked change in amplitude or pitch;
  v. point change in amplitude; and
  vi. non-linear alteration in duration.

18. A method of audio reproduction according to claim 15 in which a transformation profile comprises at least one user-defined profile.

19. A method of audio reproduction according to claim 15, further comprising selecting one metadata set based upon a respective emotion tag of the metadata set from among a plurality of metadata sets associated with a recording.

20. A method of audio reproduction according to claim 19 in which the emotion tag indicates a specific emotion conveyed by a recording when modified according to the transformation profile of the corresponding metadata set.

21. A method of audio reproduction according to claim 19 in which the emotion tag is a value on an emotional scale indicative of degree of positive or negative emotion conveyed in a recording when modified according to the transformation profile of the corresponding metadata set.

22. A method of audio reproduction according to claim 15, further comprising modifying lip synchronisation of a video game character according to transformation profile data relating to changes in duration when dialogue being delivered by the video game character is also modified according to said transformation profile data.

23. A method of audio reproduction according to claim 15, further comprising modifying facial animation of a video game character according to transformation profile data relating to changes in any or all of amplitude and pitch when dialogue being delivered by the video game character is also modified according to said transformation profile data.

24. A method of audio reproduction according to claim 15, further comprising modifying an expression of a video game character according to an emotion tag of a selected metadata set when dialogue being delivered by the video game character is also modified according to transformation profile data associated with the selected metadata set.

25. A method of audio reproduction according to claim 15, further comprising altering one or more values of a transformation profile prior to applying transformations to the recording, according to a value of one or more parameters of a video-game outputting the recording.

26. A method of audio reproduction according to claim 15, further comprising randomly altering one or more values of the transformation profile prior to applying transformations to the recording.

27. A method of audio reproduction according to claim 26 in which any or all of:
   i. a degree of random change; and
   ii. a number of random changes,
   is dependent upon a duration of game-play from a last re-load of a video-game that is outputting the recording.

28. A method of audio reproduction according to claim 15, further comprising randomly composing a given transformation profile from one or more available predefined profile elements.

29. A method of audio reproduction according to claim 15, further comprising constraining any changes to the transformation profile to substantially maintain a relative formant structure of speech within the recording upon transformation.

30. Audio reproduction apparatus, comprising:
   storage reading means for reading, from storage, an audio recording and a metadata set, the metadata set configured to be read from storage according to a degree of correspondence between emotion data in the metadata set and one or more current emotion parameters in an application;
   means for applying random variations to the emotion data in the metadata set;
   transformation processing means for applying transformations to the recording in accordance with the transformation profile, including adjusting one or more of intensity, pitch and duration transformation profiles extracted from the read metadata; and
   audio output means for outputting the transformed recording.

31. A non-transitory computer-readable recording medium storing computer readable instructions thereon, the instructions, when executed by a computer, cause the computer to carry out the method of audio processing according to claim 1.

32. A non-transitory computer-readable recording medium storing computer readable instructions thereon, the instructions, when executed by a computer, cause the computer to carry out the method of audio reproduction according to claim 15.

33. Audio processing apparatus comprising:
   a profile composer to compose one or more transformation profiles for transforming audio characteristics of an audio recording;
   a generator to generate, for each transformation profile, a metadata set comprising respective transformation profile data and location data indicative of where in the recording the transformation profile data is to be applied, the metadata set including emotion data;
   a metadata store to store each metadata set in association with the corresponding recording;
   means for selecting which metadata set is to be read from the metadata store according to a degree of correspondence between emotion data in the metadata sets and one or more current emotion parameters in an application; and
   means for applying random variations to the emotion data in the selected metadata sets;
   wherein the apparatus is configured, prior to composing the one or more transformation profiles by the profile composer, to identify locations of speech syllables in the recording.

34. Audio reproduction apparatus, comprising:
   a storage reader to read from storage a recording and a metadata set associated with said recording, in which the metadata set comprises a transformation profile, the metadata set being read from storage according to a degree of correspondence between emotion data in the metadata set and one or more current emotion parameters in an application;
   means for applying random variations to the emotion data in the metadata set;
   a transformer to apply transformations to the recording in accordance with said transformation profile; and
   an output to output the transformed recording.

* * * * *